US007295685B2

(12) United States Patent
Yamagishi

(10) Patent No.: US 7,295,685 B2
(45) Date of Patent: Nov. 13, 2007

(54) PERSONAL AUTHENTICATION APPARATUS AND LOCKING APPARATUS

(75) Inventor: Junichi Yamagishi, c/o Unirec Co., Ltd., 6-3, 2-chome, Kaminarimon, Taito-ku, Tokyo (JP) 111-0034

(73) Assignees: Unirec Co., Ltd., Tokyo (JP); Junichi Yamagishi, Tokyo (JP)

( * ) Notice: Subject to any disclaimer, the term of this patent is extended or adjusted under 35 U.S.C. 154(b) by 717 days.

(21) Appl. No.: 10/636,140

(22) Filed: Aug. 6, 2003

(65) Prior Publication Data

US 2004/0041690 A1 Mar. 4, 2004

(30) Foreign Application Priority Data

Aug. 9, 2002 (JP) ............................ 2002-234179

(51) Int. Cl.
*G06K 9/00* (2006.01)

(52) U.S. Cl. ..................................... 382/115; 340/5.53

(58) Field of Classification Search ................ 382/115, 382/118, 190, 124, 224, 116; 713/186, 184, 713/170; 235/380, 382.5; 463/25, 29; 340/5.67, 340/5.53, 5.83, 5.52, 5.8, 5.81; 902/3; 283/904, 283/77; 705/1, 26, 42, 67; 702/127
See application file for complete search history.

(56) References Cited

U.S. PATENT DOCUMENTS

| | | | | |
|---|---|---|---|---|
| 5,054,056 | A * | 10/1991 | Blythe | 379/145 |
| 5,802,199 | A * | 9/1998 | Pare, Jr. et al. | 382/115 |
| 5,920,640 | A | 7/1999 | Salatino et al. | |
| 5,999,637 | A * | 12/1999 | Toyoda et al. | 382/124 |
| 6,100,811 | A | 8/2000 | Hsu et al. | |
| 6,418,235 | B1 * | 7/2002 | Morimoto et al. | 382/118 |
| 6,937,702 | B1 * | 8/2005 | Vacek et al. | 379/88.02 |
| 2004/0059923 | A1 * | 3/2004 | ShamRao | 713/186 |

FOREIGN PATENT DOCUMENTS

| | | |
|---|---|---|
| JP | 2001-241237 | 9/2001 |
| JP | 2002-70382 | 3/2002 |
| JP | 2002-155650 A | 5/2002 |

* cited by examiner

*Primary Examiner*—Sheela Chawan
(74) *Attorney, Agent, or Firm*—Jordan and Hamburg LLP

(57) ABSTRACT

A locking apparatus has a biometric information input unit, a biometric information register for biometric information input, an ID code input unit, an ID code register, an indexer to provide an index that relates registered biometric information and ID code to each other and indicates locations where the registered biometric information and ID code are stored, an index memory, a retriever to retrieve registered biometric information from the biometric information register according to an index corresponding to an ID code input by a user into the ID code input unit, an authentication unit to authenticate the user by comparing the retrieved biometric information with biometric information input by the user, a lock driver to lock and unlock a door, and a controller to make the lock driver unlock the door when the authentication unit authenticates a person.

4 Claims, 6 Drawing Sheets

PERSONAL AUTHENTICATION APPARATUS AND LOCKING APPARATUS

BACKGROUND OF THE INVENTION

1. Field of the Invention

The present invention relates to a personal authentication apparatus for authenticating a person who intends to unlock a locking apparatus installed on a door and to a locking apparatus that conducts an unlocking operation based on personal authentication.

2. Description of Related Art

Examples of a personal authentication apparatus and locking apparatus are disclosed in Japanese Unexamined Patent Application Publication Nos. 2001-241237 and 2002-70382. Before allowing a person to handle an object or unlock a door, the disclosures ask the person to enter his or her biometric information such as a fingerprint, compare the entered fingerprint with registered fingerprints, and if the person is authenticated, permit the handling of the object or the unlocking of the door.

When registering a fingerprint in the apparatuses, a person is asked to register an ID number in addition to the fingerprint. For authentication, the person enters the fingerprint as well as the ID number, so that the apparatuses may retrieve the registered fingerprint based on the entered ID number and compare the retrieved fingerprint with the entered fingerprint.

These related arts are incapable of specifying the location of a data corruption occurring in registered ID numbers or fingerprints. Once data corrupts, the related arts must reconstruct all of the registered ID numbers and fingerprints. This needs a lot of time and labor.

SUMMARY OF THE INVENTION

An object of the present invention is to provide a personal authentication apparatus and a locking apparatus capable of easily reconstructing corrupted data.

In order to accomplish the object, a first aspect of the present invention provides a personal authentication apparatus having a biometric information input unit configured to input biometric information related to a person, an ID code input unit configured to input an ID code related to the person, a biometric information register configured to register the input biometric information, an ID code register configured to register the input ID code, an indexer configured to provide an index that relates the registered biometric information and ID code to each other and indicates locations where the registered biometric information and ID code are stored, an index memory configured to store the provided index, a retriever configured to retrieve registered biometric information from the biometric information register according to an index corresponding to an ID code input by a user into the ID code input unit, and an authentication unit configured to authenticate the user by comparing the retrieved biometric information with biometric information input by the user into the biometric information input unit.

A second aspect of the present invention provides a locking apparatus having a biometric information input unit configured to input biometric information related to a person, an ID code input unit configured to input an ID code related to the person, a biometric information register configured to register the input biometric information, an ID code register configured to register the input ID code, an indexer configured to provide an index that relates the registered biometric information and ID code to each other and indicates locations where the registered biometric information and ID code are stored, an index memory configured to store the provided index, a retriever configured to retrieve registered biometric information from the biometric information register according to an index corresponding to an ID code input by a user into the ID code input unit, an authentication unit configured to authenticate the user by comparing the retrieved biometric information with biometric information input by the user into the biometric information input unit, a lock driver configured to lock and unlock a door, and a controller configured to make the lock driver unlock the door when the authentication unit authenticates a person.

According to the first aspect, the biometric information input unit is used to input biometric information related to a person. The ID code input unit is used to input an ID code related to the person. The biometric information register is used to register the input biometric information. The ID code register is used to register the input ID code. The indexer is used to provide an index that relates the registered biometric information and ID code to each other and indicates locations where the registered biometric information and ID code are stored. The index memory is used to store the provided index. The retriever is used to retrieve registered biometric information from the biometric information register according to an index corresponding to an ID code input by a user into the ID code input unit. The authentication unit is used to authenticate the user by comparing the retrieved biometric information with biometric information input by the user into the biometric information input unit.

The first aspect simply and surely authenticates a person according to biometric information input by the person. If the registered biometric information and ID codes corrupt wholly or partly, the first aspect can quickly and easily reconstruct the corrupted data by externally providing necessary data according to the indexes that relate the biometric information and ID codes to each other.

According to the second aspect, the biometric information input unit is used to input biometric information related to a person. The ID code input unit is used to input an ID code related to the person. The biometric information register is used to register the input biometric information. The ID code register is used to register the input ID code. The indexer is used to provide an index that relates the registered biometric information and ID code to each other and indicates locations where the registered biometric information and ID code are stored. The index memory is used to store the provided index. The retriever is used to retrieve registered biometric information from the biometric information register according to an index corresponding to an ID code input by a user into the ID code input unit. The authentication unit is used to authenticate the user by comparing the retrieved biometric information with biometric information input by the user into the biometric information input unit. The lock driver is used to lock and unlock a door. The controller is used to make the lock driver unlock the door when the authentication unit authenticates a person.

The second aspect easily and surely authenticates a person according to biometric information input by the person and simply and surely unlocks a door according to the authentication. If the registered biometric information and ID codes corrupt wholly or partly, the second aspect can quickly and easily reconstruct the corrupted data by externally providing necessary data according to the indexes that relate the biometric information and ID codes to each other.

DETAILED DESCRIPTION OF EMBODIMENTS

Figure 1:
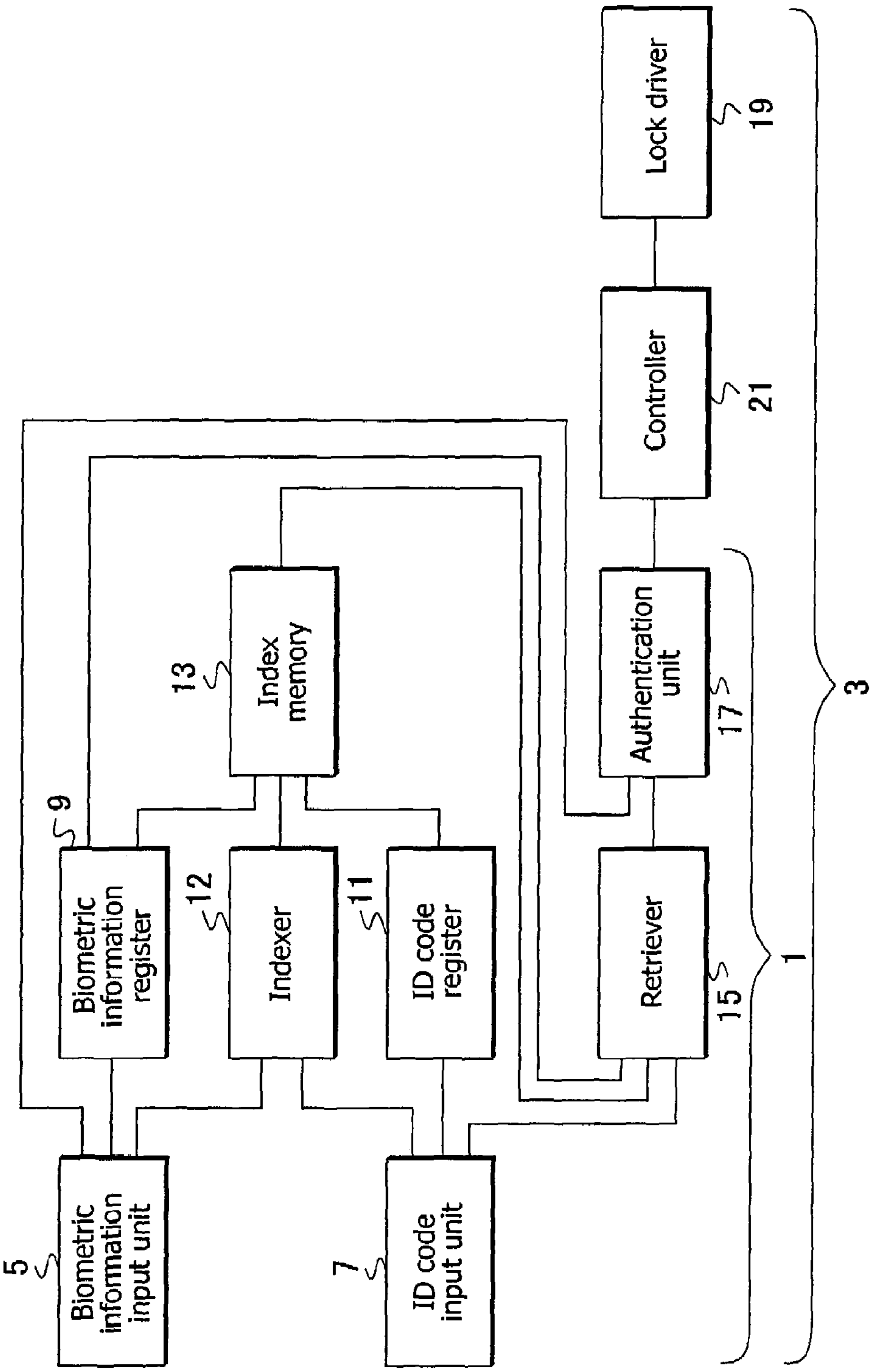
FIG. 1 is a block diagram showing a personal authentication apparatus and a locking apparatus according to an embodiment of the present invention.

FIG. 1 is a block diagram generally showing a personal authentication apparatus 1 and a locking apparatus 3 according to an embodiment of the present invention. The personal authentication apparatus 1 has a biometric information input unit 5, an ID code input unit 7, a biometric information register 9, an ID code register 11, an indexer 12, an index memory 13, a retriever 15, and an authentication unit 17. The locking apparatus 3 includes, in addition to the personal authentication apparatus 1, a lock driver 19 and a controller 21.

The biometric information input unit 5 is used to input personal biometric information, for example, information about the fingerprint, palm, vein patterns on the back of the hand, or iris of a person.

The ID code input unit 7 is used to input an ID code to identify a person.

The biometric information register 9 is used to register the biometric information input through the biometric information input unit 5.

The ID code register 11 is used to register the ID code input through the ID code input unit 7.

The indexer 12 provides an index that relates the biometric information registered in the biometric information register 9 and the ID code registered in the ID code register 11 to each other and indicates locations where the biometric information and ID code are stored.

The index memory 13 stores the index provided by the indexer 12.

The retriever 15 refers to an ID code input by a person into the ID code input unit 7, finds an index corresponding to the input ID code, and retrieves registered biometric information such as a fingerprint corresponding to the found index from the biometric information register 9.

The authentication unit 17 compares the retrieved biometric information with biometric information input by the person into the biometric information input unit 5 and authenticates the person.

The lock driver 19 is electrically driven to lock and unlock a door.

The controller 21 outputs a signal to the lock driver 19 when the authentication unit 17 authenticates a person, to electrically drive the lock driver 19 and unlock the door.

Figure 2:
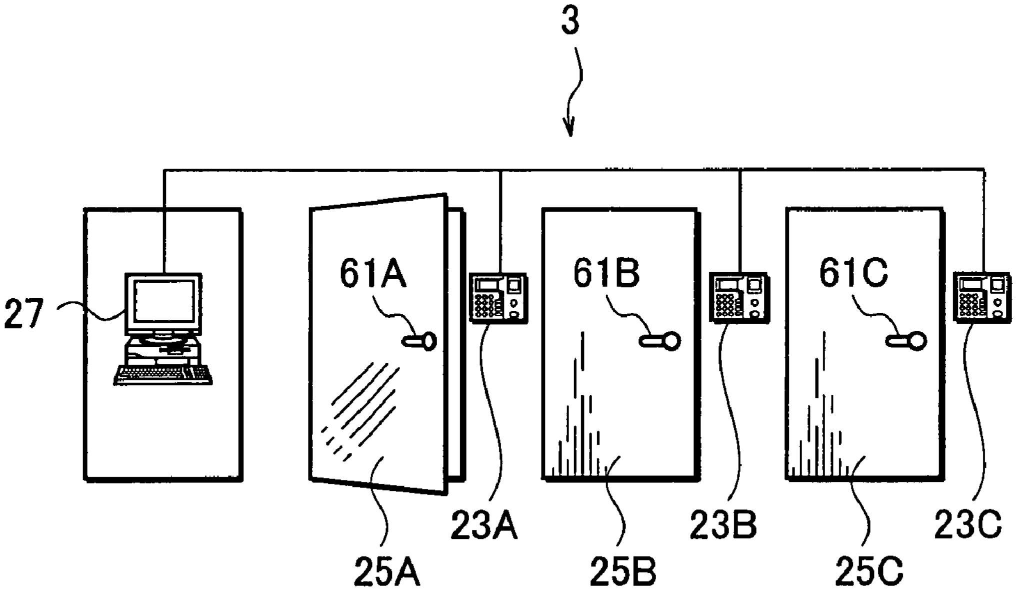
FIG. 2 is a general view showing a network configuration of locking apparatuses each consisting of the locking apparatus and authentication apparatus of FIG. 1.
Figure 3:
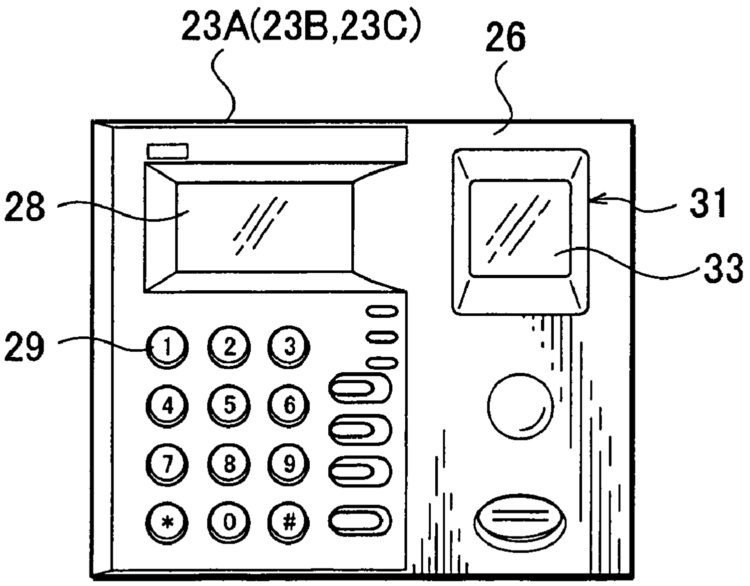
FIG. 3 is a front view showing an operation unit provided for each locking apparatus of FIG. 2.

FIG. 2 shows a network configuration of locking apparatuses each consisting of the locking apparatus and authentication apparatus of FIG. 1. FIG. 3 is a front view showing an operation unit provided for each of the locking apparatuses of FIG. 2.

In FIG. 2, the locking apparatuses 3 have the operation units 23A, 23B, and 23C, respectively, which are attached to doors 25A, 25B, and 25C, respectively. The operation units 23A to 23C are connected to a host computer 27, which controls the operation units 23A to 23C.

The operation units 23A to 23C have an identical structure, and therefore, the operation unit 23A will be explained as a representative. In FIG. 3, the operation unit 23A has a housing 26, an LCD panel 28, registration buttons 29, and a biometric verifier or a fingerprint verifier 31 provided with a lid 33.

The LCD panel 28 displays various functions. The buttons 29 are provided for the ID code input unit 7 and are used to input an ID code into the ID code input unit 7.

Figure 4:
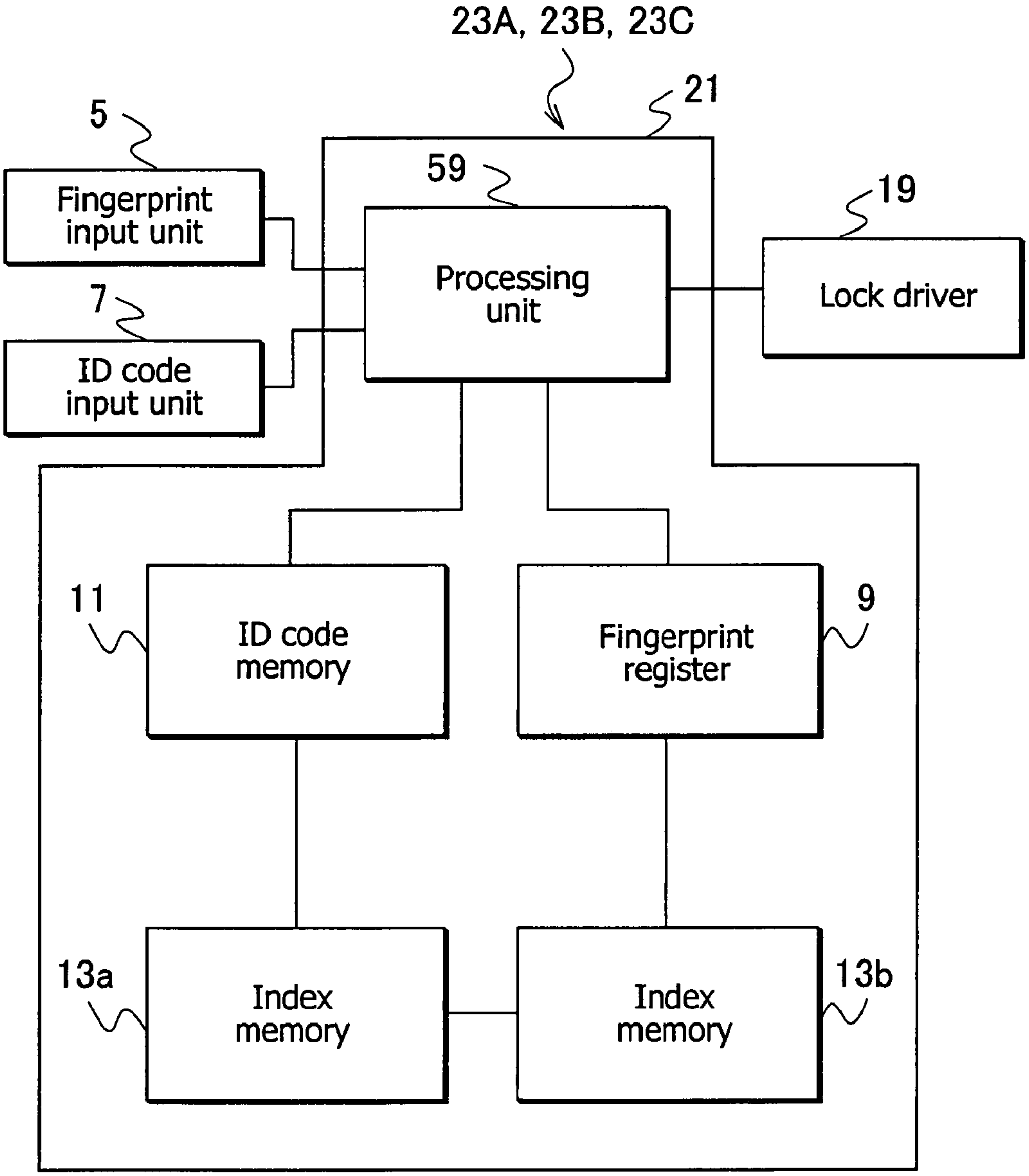
FIG. 4 is a block diagram showing the personal authentication apparatus and locking apparatus in the network configuration of FIG. 2.

FIG. 4 is a block diagram showing an example of the operation unit 23A. The operation unit 23A has the fingerprint input unit (biometric information input unit) 5, ID code input unit 7, controller 21, and lock driver 19 that is connected to an output port of the controller 21.

The fingerprint input unit 5 forms a part of the fingerprint verifier 31 and includes a fingerprint reader. A fingerprint read by the fingerprint input unit 5 is transferred to a processing unit 59 contained in the controller 21.

The ID code input unit 7 is used to input an ID code with the help of the buttons 29. The input ID code is transferred to the processing unit 59.

The controller 21 includes the processing unit 59, the biometric information register (fingerprint register) 9, the ID code register (ID code memory) 11, and the index memory 13. The index memory 13 consists of index memories 13*a* and 13*b*.

The processing unit 59 includes the indexer 12, retriever 15, and authentication unit 17.

The index memory 13*a* is related to the ID code memory 11, and the index memory 13*b* is related to the fingerprint register 9. The index memories 13*a* and 13*b* are related to each other.

Accordingly, the ID code memory 11 and fingerprint register 9 are related to each other through the index memories 13*a* and 13*b*. As a result, a registered fingerprint is related to a registered ID code through an index, which indicates locations where the fingerprint and ID code are stored. For registration, a person inputs his or her fingerprint and an ID code through the fingerprint input unit 5 and ID code input unit 7. Then, the indexer 12 provides an index for the fingerprint and ID code, the ID code memory 11 stores the ID code, the fingerprint register 9 stores the fingerprint, and the index memories 13*a* and 13*b* store the index.

Figure 5A:
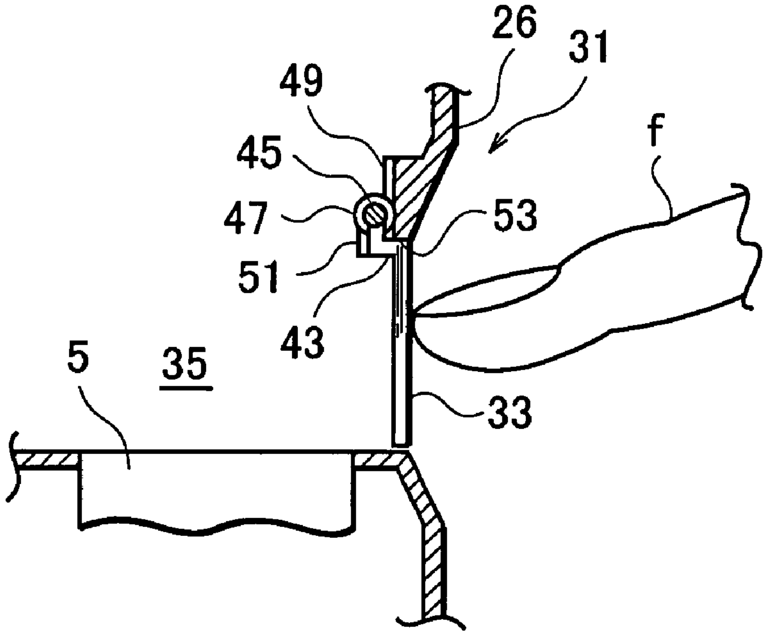
FIGS. 5A and 5B are enlarged sectional views partly showing the personal authentication apparatus and operation unit of FIG. 3 before and after insertion of a finger.
Figure 5B:
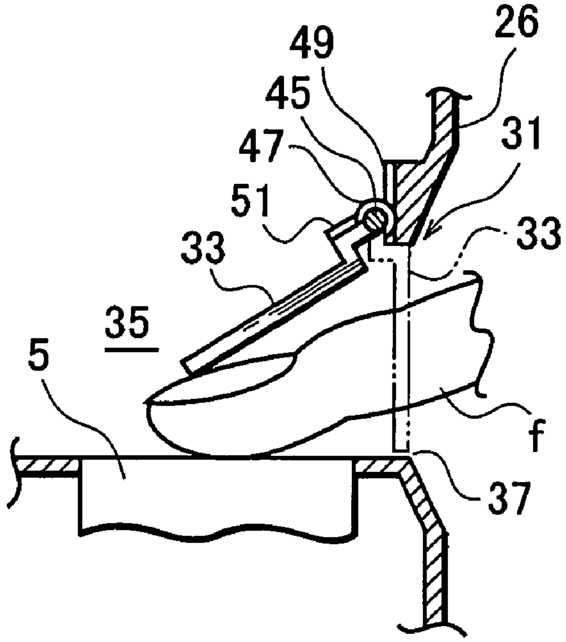

FIGS. 5A and 5B are enlarged sectional views partly showing the fingerprint verifier 31 before and after insertion of a finger. In FIGS. 3, 5A, and 5B, the housing 26 has a chamber 35. The chamber 35 is shaped to receive a finger through an opening 37 formed through the housing 26. At the bottom of the chamber 35, the fingerprint input unit (biometric information input unit) 5 is arranged. In the chamber 35, the fingerprint input unit 5 is oriented to cross a finger inserting direction (left-right direction in FIG. 5).

The opening 37 of the chamber 35 is provided with the lid 33 to open and close the chamber 35. The opening 37 and lid 33 are quadrate in front view. At a closed position, the lid 33 fits in the opening 37.

A top end 43 of the lid 33 has, for example, a hook shape and is provided with an integral shaft 45. With the shaft 45, the lid 33 is rotatably supported by the housing 26. Around the shaft 45, a torque spring 47 is wound. An arm 49 of the torque spring 47 is engaged with the housing 26, and the other arm 51 thereof with the lid 33. The torque spring 47 pushes the lid 33 toward the closed position of the opening 37.

At the closed position, the top end 43 of the lid 33 is stopped by a top edge 53 of the opening 37.

The lid 33 is made of conductive material such as metal, plastic mixed with carbon fiber, or conductive plastic.

The lid 33 is interlocked with a switch 57 (FIG. 6) of a power supply circuit provided for the locking apparatus 3, to turn on and off the power supply circuit in response to the opening and closing of the lid 33. The lid 33 is grounded.

Figure 6:
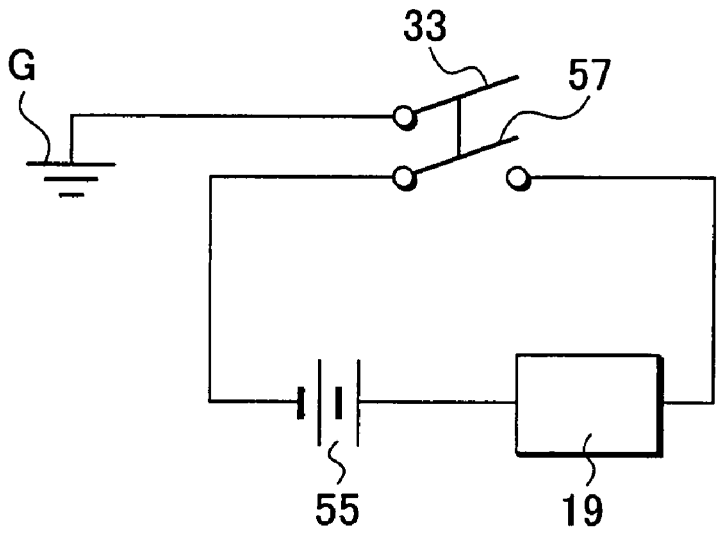
FIG. 6 is a circuit diagram showing a power supply circuit for the locking apparatus according to the embodiment.

FIG. 6 is a circuit diagram showing the power supply circuit. The power supply circuit has a power source, e.g., a battery 55 connected to the lock driver 19. Unlike a DC source, the battery 55 needs no long wiring, and therefore, is easy to install on an existing door. It is naturally possible to replace the battery 55 with a DC source.

The power supply circuit for the lock driver 19 is turned on and off through the switch 57 interlocked with the lid 33 that is grounded.

Normally, the lid 33 forced by the torque spring 47 is at the closed position to close the opening 37 and open the switch 57. As a result, the lock driver 19 receives no power from the battery 55 and the locking apparatus 3 is locked, and therefore, one cannot open the door 25A (25B, 25C) by manipulating a lever 61A (61B, 61C).

To register a fingerprint or to unlock the door, a person pushes the lid 33 with his or her finger f as shown in FIG. 5A. At this time, the static electricity of the person is immediately grounded through the lid 33 that is conductive and grounded as shown in FIG. 6.

The lid 33 is pushed by the torque spring 47 toward the closed position of the opening 37, and therefore, the finger f surely comes in contact with the lid 33 when it pushes the lid 33, to surely release static electricity from the person.

Figure 7:
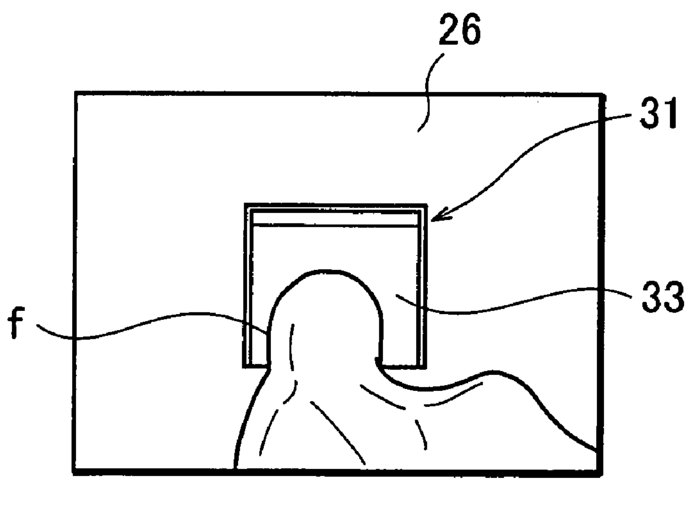
FIG. 7 is a front view partly showing the personal authentication apparatus of FIG. 5B with a finger inserted into the apparatus.
Figure 8:
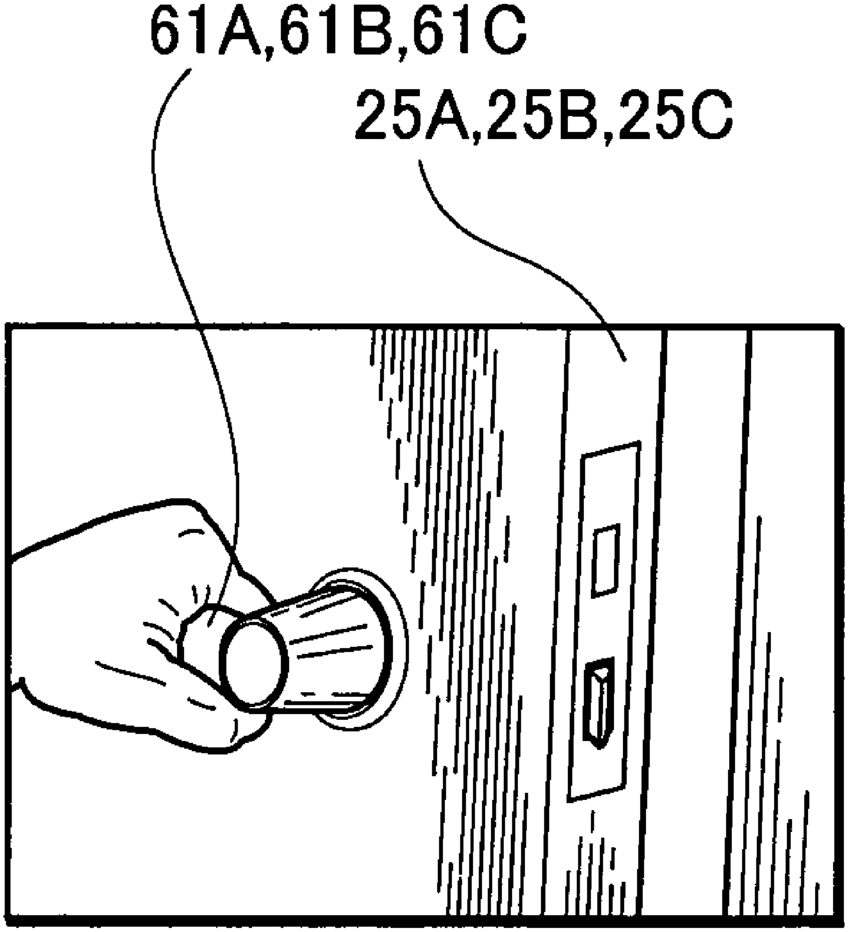
FIG. 8 is a perspective view partly showing a door of FIG. 2, the door being opened after authentication.

Thereafter, the finger f is inserted into the chamber 35 as shown in FIGS. 5B and 7. At this time, the lid 33 turns around the shaft 45 against the force of the torque spring 47. Interlocked with this movement, the switch 57 of FIG. 6 closes the power supply circuit to supply power from the battery 55 to the lock driver 19 and controller 21.

The finger f inserted into the chamber 35 faces the fingerprint input unit 5. When the finger f is set thereon, the fingerprint input unit 5 reads a fingerprint from the finger f. When the finger f is set on the fingerprint input unit 5, the static electricity of the person has already been removed, and therefore, the fingerprint input unit 5 is never harmed by static electricity.

When the finger f is taken out of the chamber 35, the torque spring 47 automatically pushes the lid 33 back to the closed position of the opening 37 as shown in FIG. 5A. Interlocked with this movement, the switch 57 automatically disconnects the power supply circuit. Namely, the power supply circuit can surely be cut. This arrangement is simple and inexpensive to save power and elongate the service life of the battery 55.

When registering a fingerprint, a person inputs an ID code with the buttons 29. For the input ID code, the processing unit 59 automatically assigns a serial index. Instead, an optional index may be entered by an operator with the buttons 29.

The processing unit 59 stores the ID code in the ID code memory 11 and the index in the index memory 13*a*.

Thereafter, the person inputs his or her fingerprint with the fingerprint input unit 5. The input fingerprint is related to the index provided just before and is registered in the fingerprint register 9. The index is also stored in the index memory 13*b*.

These ID code, fingerprint, and index are also stored in the host computer 27.

To open the door 25A (25B, 25C), a person inputs an ID code with the buttons 29. Based on the input ID code which must be stored in the ID code memory 11, the processing unit 59 retrieves an index corresponding to the ID code from the index memory 13*a*. Based on the retrieved index, the processing unit 59 refers to the index memory 13*b* and retrieves a registered fingerprint corresponding to the index from the fingerprint register 9.

When the person inputs his or her fingerprint through the fingerprint input unit 5, the processing unit 59 compares the input fingerprint with the retrieved fingerprint. If they agree with each other, the processing unit 59 authenticates the person and electrically drives the lock driver 19 to unlock the door 25A (25B, 25C).

Once the lock driver 19 unlocks the door 25A (25B, 25C), the person can use the lever 61A (61B, 61C) to open the door.

The fingerprint register 9 stores many fingerprints and the ID code memory 11 stores many ID codes. If the stored fingerprints and ID codes are wholly or partly broken, the broken ones can easily be restored according to an embodiment of the present invention.

As mentioned above, the host computer 27 stores all of the input and registered fingerprints, ID codes, and serial indexes that are related to one another. If fingerprints in the fingerprint register 9 are broken, ID codes in the ID code memory 11 and indexes in the index memory 13*a* are used to retrieve the fingerprints from the host computer 27 and register them in the fingerprint register 9.

If ID codes in the ID code memory 11 are broken, fingerprints in the fingerprint register 9 and indexes in the index memory 13*b* are used to retrieve the ID codes from the host computer 27 and register them in the ID code memory 11.

If data stored in the fingerprint register 9 and ID code memory 11 is partly broken, the location of the broken data is specifiable according to an index corresponding to the broken data. Then, a fingerprint or an ID code corresponding to the index is retrieved from the host computer 27 and is registered in the fingerprint register 9 or the ID code memory 11.

In this way, if fingerprints in the fingerprint register 9 or ID codes in the ID code memory 11 are broken, the embodiment can quickly restore the broken data unlike the related arts that must reconstruct all fingerprints and ID codes and relate them with one another again.

The personal authentication apparatuses and locking apparatuses of the network configuration of FIG. 2 are individually operable without forming a network.

What is claimed is:

1. A locking apparatus comprising:

a biometric information authentication system including:

a biometric information input unit configured to input biometric information of a person;

an ID code input unit configured to input an ID code assigned to the person;

a biometric information register preliminarily storing biometric information data at biometric register locations as registered biometric information;

an ID code register preliminarily storing ID codes at ID code register locations as registered ID codes;

an indexer configured to provide an index that relates the registered biometric information and the registered ID codes to each other using indexes that store respective ones of the ID codes and respective ones of the biometric information register locations whereat ones of the registered biometric information data are stored that are of a same person as the respective registered ID codes are assigned to;

an index memory configured to store the index;

a retriever configured to retrieve one of the biometric information data from the biometric information register according to a biometric information register location of said biometric register locations that is stored in one of the indexes corresponding to an ID code input by a user into the ID code input unit thereby indirectly relating the ID code input with the biometric information data; and an authentication unit configured to authenticate the user by comparing the retrieved biometric information data with biometric information input by the user into the biometric information input unit;

a lock driver configured to lock and unlock a door; and a controller configured to make the lock driver unlock the door when the authentication unit authenticates the user as a person having registered biometric information data stored in the biometric information register.

2. The locking apparatus of claim 1 further comprising:

a host computer interfaced with the biometric information authentication system and storing copies of the registered biometric information data, the registered ID codes, and the indexes that relate the registered biometric information data and the registered ID codes; and means for replacing ones of the registered biometric information data in the biometric information register using the indexes when the ones of the registered biometric information data are corrupted.

3. The locking apparatus of claim 2 wherein the indexer serially indexes the indexes stored in the index register.

4. The locking apparatus of claim 1 wherein the indexer serially indexes the indexes stored in the index register.

* * * * *